July 9, 1957 W. S. NICHOLSON 2,798,465
GAS ENGINE FAN FAILURE SHUT-OFF SWITCH
Filed Dec. 20, 1954
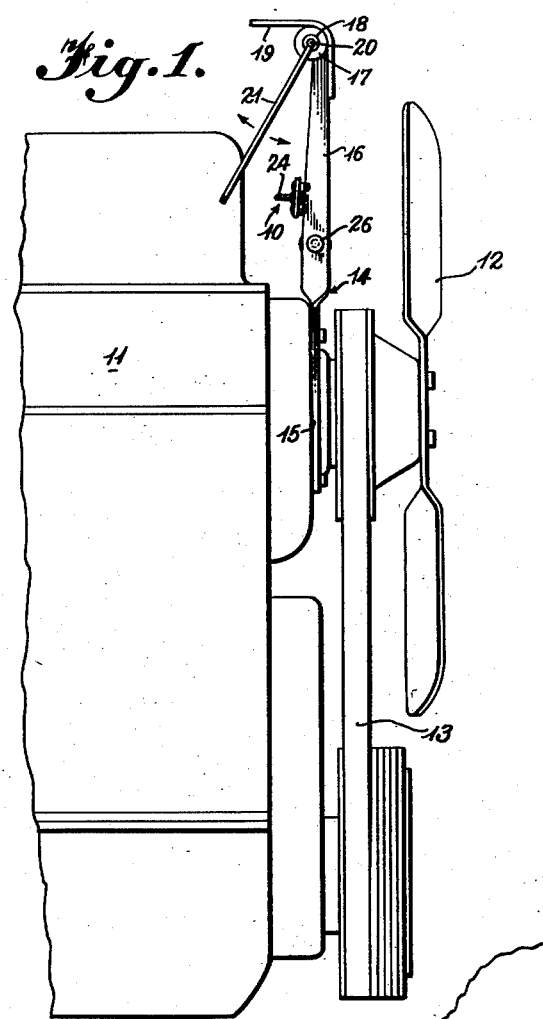
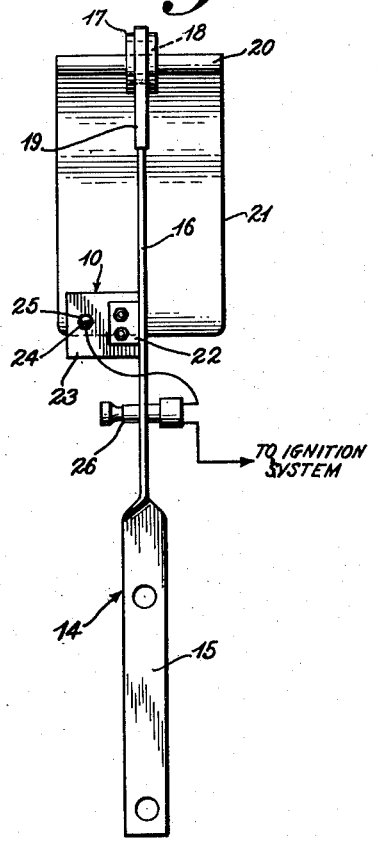
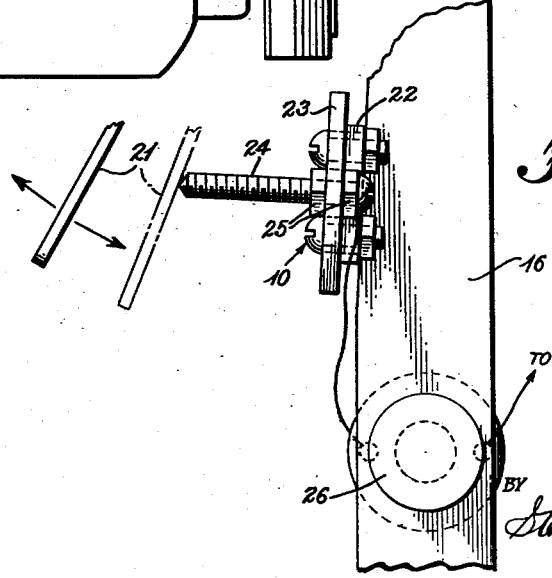
INVENTOR
*W. S. Nicholson*
BY
*Stevens, Davis, Miller and Mosher*
ATTORNEYS

2,798,465

GAS ENGINE FAN FAILURE SHUT-OFF SWITCH

Washington S. Nicholson, Jena, La.

Application December 20, 1954, Serial No. 476,393

2 Claims. (Cl. 123—41.15)

This invention relates to an automatic cut-off switch for effecting a shut-down of an air-cooled engine in the event of failure of the air-cooling mechanism. More particularly, the invention relates to an air-responsive, pendulum-type electrical contacting switch which is maintained in an open position during operation of the engine by the flow of cooling air but which, upon failure of flow of cooling air, gravitates to a closed position, thereby short-circuiting the ignition system and finds particular utility as a safety measure in engines which operate unattended for long periods such as pumping station engines and the like.

In the operation of a standard air-cooled-type engine, the failure of the air-cooling system to function properly may result in serious damage. The air-cooled engine depends in general upon a sweep of air flowing across the engine block to dissipate the heat that is generated by the functioning parts during operation. The mass of cooling air required to dissipate the heat generated is normally supplied to the engine block by a suitable fan conveniently mounted on the engine block in a position so as to direct the cooling air over the engine. The fan, mounted to the engine, is an integral part thereof and is normally driven by a suitable belt arrangement which operatively connects the turning of the drive shaft of the engine to the rotation of the shaft of the fan. In the event of failure of the fan to operate because of belt breakage, freezing of the fan shaft bearing, or the like, the engine, which would then have lost its principal means of dissipating heat, would continue to run, thereby generating an excessive quantity of heat that would soon cause overheating resulting in damage to the engine and its functioning parts. The excessive overheating manifests itself in such serious damage as bursting of the head gaskets, cracking of the engine head, burning out of oil seals, crystallizing of piston rings, etc.

In large engines of the air-cooled type, the damage resulting when the cooling system fails during operation of the engine requires expensive repairs and replacement of parts to put the engine in operative condition. In most cases the engine must be completely disassembled to make such repairs and replacements. This is particularly true in the oil industry where, for example, the air-cooled type of engine is extensively used for producing wells. These air-cooled engines must be in continuous operation and, because of the distance between wells, they remain unattended for several hours of each day as it would be impractical to station a man at each engine to insure its continuous operation. Therefore, any failure of the air-cooling system of these engines during operation in the field causes extensive damage to the engine and stops production of the well during the time required to recondition the engine and return it to service.

Because of the risk of engine failure, the belts operatively connecting the drive shaft of the engine to the drive shaft of the fan are replaced more frequently than necessary. This replacement of belts is a tedious and time-consuming job which necessitates taking the engine out of operation while the belts are being replaced, thereby causing a loss of production from the well.

The art has long recognized the need for automatic protection against overheating but the efforts heretofore made have involved equipment that is either prohibitively expensive or, if reasonable in cost, then tending to be unreliable in operation.

It is an object of the present invention to overcome the deficiencies of the prior art and to provide a simple, low cost device for protecting engines from overheating that is characterized by a high degree of reliability.

In order to overcome such damage to the engines and loss of oil production occasioned by failure of the air-cooling mechanism, this invention contemplates the use of an air-actuated, pendulum-type, short-circuiting switch that remains open as long as cooling air is flowing from the fan, but which closes when sufficient air to cool the engine fails to flow. Pendulum contact of the switch results in the shunting of the major part of the current away from the spark plugs through the switch to the engine block, thereby causing a short-circuiting of the ignition system which stops the engine before any heat damage to the functioning parts can take place.

Additional objects will become apparent from examination of the description, drawings, and claims.

Having described in the foregoing in a general way the nature, substance and objects of this invention, there follows a more detailed description of a preferred embodiment thereof, with reference to the accompanying drawings in which:

Figure 1 is a side elevational view showing an air-actuated cut-off switch having an air-supported, pendulum-type contact member.

Figure 2 is a front elevational view of the air-actuated cut-off switch shown in Figure 1, looking in the direction in which the air flows.

Figure 3 is a fragmentary view of a portion of the air-actuated cut-off switch shown in Figure 1, illustrating the details of the contact pin.

The invention will be described in detail in connection with the accompanying drawings, in which Figure 1 shows an air-actuated, pendulum-type cut-off switch 10 mounted on an engine block 11 in the path of a flow of cooling air produced by a fan 12 which is operatively connected to the main drive shaft of the engine by a belt 13. The cut-off switch has a main support bracket 14 which is fabricated from a flat strip of metal having its bottom portion 15 turned at right angles to the plane of the top portion 16. The bottom portion 15 receives therethrough bolts which secure the bracket 14 to the engine block 11. At the upper extremity of top portion 16 of the metal bracket 14 there is mounted a circular metal pillar block 17 which houses a bushing 18. Resting on top of the circular piller block 17 is a right-angle stop strip 19 having one leg secured to the vertical edge of the top portion 16 of bracket 14 and fitting around the top of the pillar block 17 so that the other leg extends horizontally out from the top of pillar block 17. Within the metal bushing 18 is pivotally mounted for free and easy rotation, a horizontal metal shaft 20 which extends a short distance out from each side of the bushing 18. To the horizontal shaft 20 is mounted a flat metal pendulum contacting plate 21 which is free to pivot with shaft 20 within bushing 18. The contact plate 21 is fabricated from a flat steel plate, equal in width to the length of shaft 20 and secured along a line in the outer periphery of the shaft 20 parallel with the axis of the shaft except for that portion of the shaft which is housed within the bushing 18. The metal plate 21 extends outward from the shaft 20 so that the lower edge of the plate 21 defines an arc intersecting the top portion 16 of bracket 14 at a point that is a substantial distance from the top.

At the lower extremity of the top portion 16 of bracket 14 is positioned a flange 22 which functions as a base for holding an insulated block 23. The flange 22 is provided with two holes through which two bolts secure the insulated block 23 in a position perpendicular to the plane of the bracket and in a radial plane with respect to the pivoting metal contact plate 21.

The insulated block 23, shown best in Figure 3, is provided with a hole for mounting a pointed, threaded metal contact pin 24. The contact pin 24 is located so that its threaded shank extends perpendicularly out from the face of the insulated block 23. Two lock nuts 25 are threadedly engaged on the contact pin, one on each side of the insulated block 23, to provide a clamp for holding the contact pin in its perpendicular position.

This arrangement of the contact pin with respect to the insulated block places the contact point of the contact pin 24 in the lower extremity of the path generated by the contact plate 21 as it pivots about the axis of bushing 18 and restricted in its upward movement by the horizontal leg of the right-angle stop 19. When the contact plate 21 is in a near vertical position it rests against the contact point 24, thereby providing an electrical connection between the contact pin 24 and the engine block 11 by means of the metal-to-metal contact of the elements that compose the air-operated cut-off switch 10.

An electrical connector wire is clamped at one end between one of the lock nuts 25 and the inner face of the head of pin 24 and at the other end to one of the poles of a standard push-pull switch 26 which is located at the lower portion of the top portion 16 of bracket 14, just below the insulated block 23.

The push-pull switch 26 is mounted through a hole in the bracket, and a wire connects the other pole to a spark plug wire. This arrangement completes the electrical connection between the engine block and the ignition system, thereby providing a means for grounding the ignition system whenever the metal plate 21 is in contact with the contact pin 24 and the push-pull switch 26 is in a position which allows an electrical connection therethrough.

The air-actuated cut-off switch provides a closed electrical circuit when the metal contact plate 21 is allowed to contact the metal pin 24 thereby grounding the ignition system through the engine block 11. This occurs when the air flow generated by the air cooling system, the fan 12, is insufficient to support the metal contact plate 21 in a position as shown in full lines in Figure 3, which is out of contact with the metal contact pin 24. The metal contact plate 21 is restricted from pivoting out of that portion of the path located below the horizontal by the horizontal leg of the stop strip 19. Thus the metal plate 21 is free to swing about the axis of bushing 18 through an arc defined by the outer extremities of the contact pin 24 and the horizontal leg of stop strip 19. This confinement of the swing of the metal plate 21 prevents the plate from flipping over and coming to rest on the opposite sides of the metal bracket where it would be out of operation in the event of an abnormal blast of cooling air from the cooling mechanism.

To start the engine, the push-pull switch 26 first must be in a circuit open position so that the electrical contact through the switch with respect to the grounding of the ignition system is broken. This allows the spark plugs to receive the full sparking current from the ignition system to assure operation of the engine. As soon as the engine is in full operation and is generating the necessary flow of cooling air the push-pull switch is again actuated to a circuit closing position thereby completing an electrical connection between the contact point 24 and the ignition system. The ignition system is not grounded, however, because the mass of cooling air flowing over the engine block supports the metal pendulum-type contact plate 21 out of contact with the contact point 24, thereby allowing the full current from the ignition system to energize the spark plugs.

Failure of the cooling mechanism at any time during the operation of the engine to supply the requisite amount of cooling air results in the lack of support for holding the metal contact plate away from the contact pin. The metal contact plate 21, due to the force of gravity, thereby swings about the pivotal axis of bushing 18 and comes to rest against the contact point 24. This contacting provides a direct electrical path, grounding the ignition system.

What is claimed is:

1. A cut-off device for internal combustion power plants of the type having a cooling fan comprising an ignition system for controlling the operation of said power plant, a bracket mounted on said power plant, a bushing member fixed at the upper end of said bracket, an insulated contact pin centrally mounted on said bracket, a pendulum having a face of large surface area, said pendulum being adapted to pivot in said bushing at its upper edge, said pendulum being gravity biased towards a vertical plane to a circuit closing position when resting on said contact pin but having its face of large surface area in the path of air from said fan so that the pendulum is movable to a circuit opening position in response to the normal flow of cooling air to said power plant, a stop mounted on said bracket to prevent said pendulum from being air-blasted out of operating position, a manually operated switch and connector wires, one between said contact point and said manually operated switch and the other wire between said manually operated switch and said ignition system for manually breaking the circuit of said cut-off switch, whereby failure of the flow of air to said power plant when the manually operated switch is closed, causes a grounding of said ignition system thereby rendering said power plant inoperative.

2. A cut-off device for internal combustion power plants of the type that include an ignition system and a cooling fan comprising means including a switch to short circuit said ignition system, a pendulum constituting a part of said switch, said pendulum having a face of large surface area facing said fan, said pendulum being suspended for movement from a dependent, gravity induced circuit closing position to a raised, circuit opening position in response to the flow of air issuing from said fan.

References Cited in the file of this patent

UNITED STATES PATENTS

| | | |
|---|---|---|
| 2,162,174 | Jones | June 13, 1939 |
| 2,211,971 | Flanders | Aug. 20, 1940 |